(12) United States Patent
Mikkelsen et al.

(10) Patent No.: US 8,329,235 B2
(45) Date of Patent: *Dec. 11, 2012

(54) METHOD FOR PRODUCING CHEWING GUM GRANULES, A GUM COMPOSITION EXTRUDER AND GRANULATING SYSTEM, AND A CHEWING GUM PRODUCTS

(75) Inventors: Rikke Mikkelsen, Vejle (DK); Niels Ravn Schmidt, Barrit (DK)

(73) Assignee: Gumlink A/S, Vejle (DK)

( * ) Notice: Subject to any disclaimer, the term of this patent is extended or adjusted under 35 U.S.C. 154(b) by 113 days.

This patent is subject to a terminal disclaimer.

(21) Appl. No.: 10/555,874

(22) PCT Filed: May 6, 2004

(86) PCT No.: PCT/DK2004/000320
§ 371 (c)(1),
(2), (4) Date: Feb. 15, 2006

(87) PCT Pub. No.: WO2004/098307
PCT Pub. Date: Nov. 18, 2004

(65) Prior Publication Data
US 2006/0257524 A1    Nov. 16, 2006

(30) Foreign Application Priority Data
May 6, 2003    (EP) ..................... 03388033

(51) Int. Cl.
*A23G 4/00* (2006.01)
(52) U.S. Cl. ..................... 426/3; 426/4; 426/5
(58) Field of Classification Search ............... 426/3, 5, 426/516, 285, 454
See application file for complete search history.

(56) References Cited

U.S. PATENT DOCUMENTS

| | | |
|---|---|---|
| 1,267,320 A | 5/1918 | Fries |
| 2,007,965 A | 7/1935 | Ellis |
| 2,290,120 A | 7/1942 | Thomas |
| 2,353,927 A | 10/1942 | Pickett |
| 2,635,964 A | 4/1953 | Hewitt et al. |
| 3,262,784 A | 7/1966 | Bucher |
| 3,440,060 A | 4/1969 | Rife et al. |
| 3,800,006 A | 3/1974 | Katayama et al. |
| 4,000,321 A | 12/1976 | Mochizuki et al. |
| 4,057,537 A | 11/1977 | Sinclair |
| 4,117,645 A | 10/1978 | Phillips |
| 4,139,589 A | 2/1979 | Beringer et al. |
| 4,161,544 A | 7/1979 | Kaul |
| 4,254,149 A | 3/1981 | Rudolph et al. |
| 4,329,369 A | 5/1982 | Tezuka et al. |
| 4,370,350 A | 1/1983 | Fisher et al. |
| 4,405,647 A | 9/1983 | Fisher et al. |
| 4,525,363 A | 6/1985 | D'Amelia et al. |
| 4,564,519 A | 1/1986 | Pellico et al. |
| 4,675,311 A | 6/1987 | Gatti et al. |
| 4,731,435 A | 3/1988 | Greene et al. |
| 4,737,366 A | 4/1988 | Gergely et al. |
| 4,753,805 A | 6/1988 | Cherukuri et al. |
| 4,847,090 A | 7/1989 | Della Posta et al. |
| 4,882,168 A | 11/1989 | Casey et al. |
| 4,968,511 A | 11/1990 | D'Amelia et al. |
| 4,971,806 A | 11/1990 | Cherukuri et al. |
| 5,017,385 A | 5/1991 | Wienecke |
| 5,045,325 A * | 9/1991 | Lesko et al. ............... 426/5 |
| 5,154,927 A | 10/1992 | Song et al. |
| 5,154,939 A | 10/1992 | Broderick |
| 5,161,544 A | 11/1992 | Morris |
| 5,318,784 A | 6/1994 | Reat et al. |
| 5,354,556 A | 10/1994 | Sparks et al. |
| 5,530,074 A | 6/1996 | Jarrett et al. |
| 5,536,511 A | 7/1996 | Yatka |
| 5,538,742 A | 7/1996 | McHale et al. |
| 5,545,415 A | 8/1996 | Tyrpin et al. |
| 5,569,477 A | 10/1996 | Nesbitt |
| 5,610,266 A | 3/1997 | Buchholz |
| 5,643,630 A | 7/1997 | Hinzpeter et al. |
| 5,667,824 A | 9/1997 | Ream et al. |
| 5,672,367 A | 9/1997 | Grijpma et al. |
| 5,711,961 A | 1/1998 | Reiner et al. |
| 5,753,805 A | 5/1998 | Maloney |
| 5,866,179 A | 2/1999 | Testa |
| 5,879,728 A | 3/1999 | Graff et al. |
| 5,885,631 A | 3/1999 | Kwon et al. |
| 5,942,170 A | 8/1999 | Peitz |
| 6,013,287 A | 1/2000 | Bunczek et al. |
| 6,017,565 A | 1/2000 | Rancich et al. |
| 6,153,231 A | 11/2000 | Li et al. |
| 6,190,773 B1 | 2/2001 | Imamura et al. |
| 6,194,008 B1 | 2/2001 | Li et al. |

(Continued)

FOREIGN PATENT DOCUMENTS
DE    2808160    8/1979
(Continued)

*Primary Examiner* — Nikki H Dees
(74) *Attorney, Agent, or Firm* — Sughrue Mion, PLLC

(57) ABSTRACT

The invention relates to a method for producing chewing gum granules. The method comprises at least the steps of feeding a gum composition including at least gum base into an extruder (2), pressurizing the gum composition in the extruder, extruding the gum composition through a die plate (5), and cutting the extruded gum composition in a liquid filled chamber (4). Flavor is added to the composition in the extruder prior to the granulation into cooling liquid. The temperature and pressure of the flavored gum composition is controlled so that the temperature is below 70° C. when the pressure is in the range from 1 to 5 hPa.

26 Claims, 2 Drawing Sheets

U.S. PATENT DOCUMENTS

Figure 1:
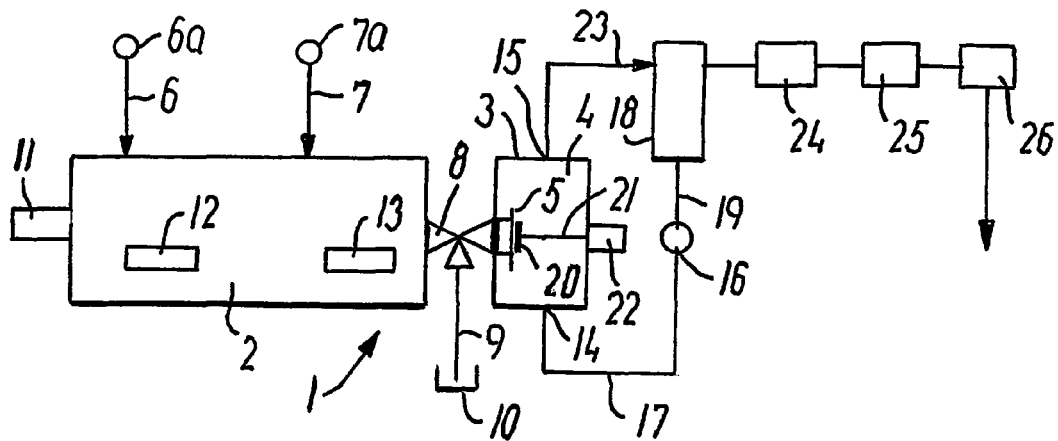

| | | |
|---|---|---|
| 6,200,608 B1 | 3/2001 | Gmunder et al. |
| 6,290,985 B2 | 9/2001 | Ream et al. |
| 6,322,806 B1 | 11/2001 | Ream et al. |
| 6,322,828 B1 | 11/2001 | Athanikar et al. |
| 6,441,126 B1 | 8/2002 | Cook et al. |
| 6,733,818 B2 | 5/2004 | Luo et al. |
| 2001/0002998 A1 | 6/2001 | Ream et al. |
| 2002/0136796 A1* | 9/2002 | Warrington et al. .............. 426/3 |
| 2004/0115305 A1 | 6/2004 | Andersen et al. |
| 2004/0142066 A1 | 7/2004 | Andersen et al. |
| 2004/0146599 A1 | 7/2004 | Andersen et al. |
| 2004/0156949 A1 | 8/2004 | Andersen et al. |
| 2004/0180111 A1 | 9/2004 | Andersen et al. |
| 2005/0175733 A1 | 8/2005 | Thorengaard et al. |
| 2005/0220934 A1 | 10/2005 | Leadbeater et al. |
| 2005/0244538 A1 | 11/2005 | Andersen et al. |
| 2006/0003050 A1 | 1/2006 | Nissen |
| 2006/0039872 A1 | 2/2006 | Schmidt |
| 2006/0051455 A1 | 3/2006 | Andersen et al. |
| 2006/0099300 A1 | 5/2006 | Andersen et al. |
| 2006/0115433 A1 | 6/2006 | Andersen et al. |
| 2006/0121156 A1 | 6/2006 | Andersen et al. |
| 2006/0147580 A1 | 7/2006 | Nissen et al. |
| 2006/0165842 A1 | 7/2006 | Andersen et al. |
| 2006/0204451 A1 | 9/2006 | Salini |
| 2006/0240143 A1 | 10/2006 | Andersen et al. |
| 2006/0246174 A1 | 11/2006 | Andersen et al. |
| 2006/0257524 A1 | 11/2006 | Mikkelsen et al. |
| 2007/0141200 A1 | 6/2007 | Mikkelsen et al. |

FOREIGN PATENT DOCUMENTS

| | | |
|---|---|---|
| DE | 3732677 | 4/1989 |
| DE | 19751330 | 5/1995 |
| EP | 0151344 | 8/1985 |
| EP | 0 221 850 A2 | 5/1987 |
| EP | 0221850 | 5/1987 |
| EP | 0253040 | 1/1988 |
| EP | 0258780 | 3/1988 |
| EP | 0267160 | 5/1988 |
| EP | 0370296 | 5/1990 |
| EP | 0399479 | 11/1990 |
| EP | 0427185 | 11/1990 |
| EP | 0415656 | 3/1991 |
| EP | 0437098 | 7/1991 |
| EP | 0500098 | 8/1992 |
| EP | 0513978 | 11/1992 |
| EP | 0558965 | 9/1993 |
| EP | 0711506 | 5/1996 |
| EP | 0890358 | 1/1999 |
| EP | 1066759 | 1/2001 |
| EP | 1306013 | 5/2003 |
| EP | 1354908 | 10/2003 |
| EP | 1449525 | 8/2004 |
| EP | 1554935 | 7/2005 |
| EP | 1752048 | 2/2007 |
| GB | 1484832 | 9/1990 |
| JP | 48019950 | 6/1973 |
| JP | 04252143 | 9/1992 |
| JP | 06046760 | 2/1994 |
| JP | 08196214 | 8/1996 |
| JP | 09047226 | 2/1997 |
| WO | 9411441 | 5/1994 |
| WO | 9414331 | 5/1994 |
| WO | 9416574 | 8/1994 |
| WO | 9422323 | 10/1994 |
| WO | 9603111 | 2/1996 |
| WO | 8603967 | 7/1996 |
| WO | 9721424 | 6/1997 |
| WO | 9725877 | 7/1997 |
| WO | 9927798 | 6/1998 |
| WO | WO 99/33353 | 7/1999 |
| WO | 0019837 | 4/2000 |
| WO | 0019977 | 4/2000 |
| WO | 0025598 | 5/2000 |
| WO | 0035296 | 6/2000 |
| WO | 0035297 | 6/2000 |
| WO | 0056281 | 9/2000 |
| WO | 0101788 | 1/2001 |
| WO | 0147368 | 7/2001 |
| WO | 0154512 | 8/2001 |
| WO | 0172139 | 10/2001 |
| WO | 0193694 | 12/2001 |
| WO | 02051258 | 7/2002 |
| WO | 02069729 | 9/2002 |
| WO | 02071860 | 9/2002 |
| WO | 02076227 | 10/2002 |
| WO | 02076228 | 10/2002 |
| WO | 02076229 | 10/2002 |
| WO | 02076230 | 10/2002 |
| WO | 02076231 | 10/2002 |
| WO | 02076232 | 10/2002 |
| WO | 02078459 | 10/2002 |
| WO | 02094032 | 11/2002 |
| WO | 02094033 | 11/2002 |
| WO | WO 02/094032 A1 | 11/2002 |
| WO | 03011045 | 2/2003 |
| WO | 03053156 | 7/2003 |
| WO | WO 03/053156 A1 | 7/2003 |
| WO | 03084338 | 10/2003 |
| WO | 2004004478 | 1/2004 |
| WO | 2004004479 | 1/2004 |
| WO | 2004004480 | 1/2004 |
| WO | 2004006686 | 1/2004 |
| WO | 2004028265 | 4/2004 |
| WO | 2004028266 | 4/2004 |
| WO | 2004028267 | 4/2004 |
| WO | 2004028268 | 4/2004 |
| WO | 2004028269 | 4/2004 |
| WO | 2004028270 | 4/2004 |
| WO | 2004068964 | 8/2004 |
| WO | 2004068965 | 8/2004 |
| WO | 2004073691 | 9/2004 |
| WO | 2005063038 | 7/2005 |

* cited by examiner

METHOD FOR PRODUCING CHEWING GUM GRANULES, A GUM COMPOSITION EXTRUDER AND GRANULATING SYSTEM, AND A CHEWING GUM PRODUCTS

The present invention relates to a method for producing chewing gum granules, which method comprises at least the steps of a) feeding a gum composition into an extruder; b) pressurizing the gum composition in the extruder; c) extruding the gum composition through a die means; d) cutting the extruded gum composition in a liquid filled chamber. The present invention further relates to a gum composition extruder and granulating system comprising an extruder with at least one inlet and an outlet, and granulating device communicating with the outlet of the extruder and having a die means for extruding the gum composition.

A method with the steps a) to d) is disclosed in U.S. Pat. No. 4,117,645. Here the gum composition is mixed and blended in molten state at an elevated temperature of about 120° C. and subsequently cooled somewhat in a heat exchanger and fed to the inlet of an extruder. The extruder delivers the gum composition for extrusion through orifices in a pellet cutting head located in a water-filled chamber. As the pellets are formed in the chamber a slurry of pellets and water is formed in the chamber, and the pellets are conveyed hydraulically to a holding tank. Although the water in the chamber at the cutting head cools the extruded and cut pellets after the extrusion, the blended gum composition is nevertheless subjected to elevated temperature influences for an extended period. According to U.S. Pat. No. 4,117,645 the gum pellets are kept suspended in water until they are to be used in the formulation of a chewing gum composition.

WO 02/094032 describes a similar process of pelletizing. A gum composition is also in this case mixed and blended together in bulk at an elevated temperature, and flavours and sweeteners are added and blended together with the other ingredients. Then the gum composition is cooled and cut into centre pieces. These centre pieces are conveyed to the extruder where they are re-heated and extruded through the pellet cutting head. After cooling in the water, the cut pellets are dried, dusted with an anti-agglomerating compound, classified, and then coated by conventional panning techniques to create finished gum products.

It is a purpose of the present invention to improve the taste quality of the gum product, in particular in relation to delicate tastes in the gum.

With a view to this, the method according to the present invention is characterized in that at least one flavour including fragile flavour components is added to the gum composition in the extruder and that the temperature and pressure of the thus flavoured gum composition is controlled so that the temperature of the flavoured gum composition is below 70° C. when the pressure of the flavoured gum composition is in the range from 1 to 5 hPa, whereas the pressure of the flavoured gum composition is of at least 5 hPa if the temperature of the flavoured gum composition exceeds 70° C.

By adding flavour to the gum composition in the extruder the flavour is added immediately before the composition is extruded through the die means into the water filled chamber where the extruded and cut chewing gum composition is immediately cooled to low temperatures. The flavour is only subjected to elevated temperatures during the extrusion, such as only during the latter part thereof, and the short duration of the extrusion and the quick cooling in the water prevents or reduces decomposition of fragile flavours components, thus preserving a maximum of flavour components. This is especially important for natural flavours in order, to maintain the full natural taste of the flavour. Beside one or more flavours, sweeteners and other ingredients can of course be added to the gum composition in the extruder.

By controlling the temperature of the flavoured gum composition to be below 70° C., when the pressure of the flavoured gum composition is in the range from 1 to 5 hPa, many of the flavours of temperature sensitive type in gum compositions will well accept temporary temperature rises of up to 70° C. In case the flavours have a low boiling point of about 25° C. it can be an advantage to keep said temperature below 50° C.

During extrusion through the die means higher temperatures are often required in order to obtain an acceptable production speed. The higher temperatures than 70° C. can be acceptable without evaporation of flavours by keeping the flavoured gum composition at pressures of at least 5 hPa.

The mixing of gum composition and flavour in the extruder causes heating. Although it is possible to cool the mixed composition in an open cooler prior to the final extrusion through the die means, it is preferred that the flavoured gum composition is maintained enclosed in the extruder and possible subsequent equipment until the extrusion in step c). By keeping the mixed composition enclosed in the extruder evaporation of flavour components is avoided, and the mixed composition is furthermore more quickly extruded into the liquid filled chamber when an intermediate cooling is avoided.

It is preferred that the extruder controls the temperature and pressure of the flavoured gum composition, e.g. by adjusting the speed of the extruder screw in dependency of the formulation of the flavoured gum composition and according to the actual configuration of the die means, or by adjusting the amount of heat delivered from the extruder to the composition. The extruder can alternatively have fixed operating parameters with the consequence that no actual control is done by the extruder. In that case it is required to finely adapt the formulation of the gum composition to the extruder and die means, and such adaptation influences the final gum product and is thus not preferred.

The flavour(s) added can take several forms, such as liquid flavour agents, e.g. an essence or oil, which can be encapsulated in a protective matrix. Other flavour(s) such as dry flavour, or mixtures of liquid and dry flavours can also be used.

In addition to adding flavours it is, if desired, also possible to add at least one sweetener to the gum composition in the extruder. Such a sweetener can be a natural sweetener, but preferably it is a high potent sweetener, such as one or more selected from the group comprising dipeptides and N-sulfonylamides.

When both sweetener and flavour are to be added in dry form it is possible to add each of them by individual supply devices on the extruder. It is, however, preferred that the dry flavour and powder sweetener are blended before entering the extruder as this allows a more simple extruder construction.

The extruder can typically have a hopper for feeding gum base particles or pellets into the extruder, and such a hopper can be utilized for addition of several different ingredients by blending the gum base pellets with dry flavour and/or powder sweetener before entering the extruder.

The very advantageous full flavour taste obtained by the method according to the present invention can be utilized to produce high-quality gum tablets by conveying the flavoured and extruded gum composition, cut into granules, to a tablet pressing apparatus and including it in compressed chewing gum tablets. The compression can be performed at suitably low temperatures, such as well below 50° C., so that all flavour components are fully utilized.

As mentioned above the flavoured gum composition can, if considered suitable in relation to the desired properties of the final gum product, be provided with a sweetener, such as a high potent sweetener, that is slowly released from the chewing gum composition. If a quick release of sweetness during the initial chew is also desirable the tablet pressing apparatus can in addition to the granulated gum composition also be supplied with at least one bulk sweetener, preferably sorbitol, for it to be included in the compressed gum product.

The extruded and cut, flavoured gum granules can have a rather large average diameter, e.g. in the range from 3 mm to 5 mm and can be provided with a suitable coating for use as a flowable final gum product. In case the granulated gum composition is for use in tableted compressed gum products, the extruded and cut gum composition has preferably an average diameter in the range from 0.1 mm to 2.5 mm, suitably from 0.25 to 1.95 mm in order to provide easy and comparably compact filling of the tableting apparatus and a good texture in the compressed gum tablets.

As mentioned above gum base can be provided as pellets to the extruder. However, it is also possible to feed gum base in a viscous, non-solid state to the extruder. In an advantageously embodiment the gum base is obtained from a gum base production line. In this embodiment the gum base is lead directly from the production line to the extruder. Thus storage of the gum base and an optional pelletizing step can be avoided. The viscous, non-solid gum base can be provided in pure form to the extruder or it can be mixed with e.g. a sweetener to form a gum composition. Such mixing is easy to perform, e.g. at the inlet to the extruder because the gum base is in a non-solid state.

According to an embodiment the gum base from the production line has a temperature in the range 95° C.-135° C., preferably in the range 105° C.-125° C.

For some purposes it is preferred that the gum base is cooled to a temperature of 70° C. and below, suitable below 55° C. This may be necessary when the pressure in the extruder is low, e.g. in the range 1 hPa-5 hPa, to e.g. avoid evaporation of flavour.

The present invention furthermore relates to a gum composition extruder and granulating system comprising an extruder with at least one inlet and an outlet, and a granulating device communicating with the outlet of the extruder and having a die means for extruding the gum composition. In order to achieve the abovementioned advantages, the system according to the invention is characterized in that said at least one inlet of the extruder communicates with a supply for gum composition and at least a supply for gum flavour.

In an embodiment said at least one inlet of the extruder communicates with a supply for at least one sweetener so that both flavour and sweetener are added to the composition in the extruder in order to obtain during mastication the desirable extended release for both high-quality flavour and sweetener.

Instead of using several inlets on the extruder, the system can include a blender device which blends gum composition and gum flavour and possibly also gum sweetener before it supplies the blended gum materials to the inlet of the extruder.

In an embodiment of a suitable simple design said supply for gum flavour includes a nozzle for spaying liquid flavour onto gum composition pellets. Apart from having a simple construction, the nozzle for spaying liquid flavour onto pellets can also be used as retro-fit equipment for installation on existing extruders so that provision for separate liquid inlets on the extruder is avoided.

In another embodiment a hopper for supplying gum composition pellets is mounted at one inlet, and said supply for gum flavour includes a liquid dosing device mounted at another inlet of the extruder. This embodiment can e.g. be of use when addition of very fragile flavours is to take place at a shorter distance from the die means than the distance to said one inlet.

Figure 2:
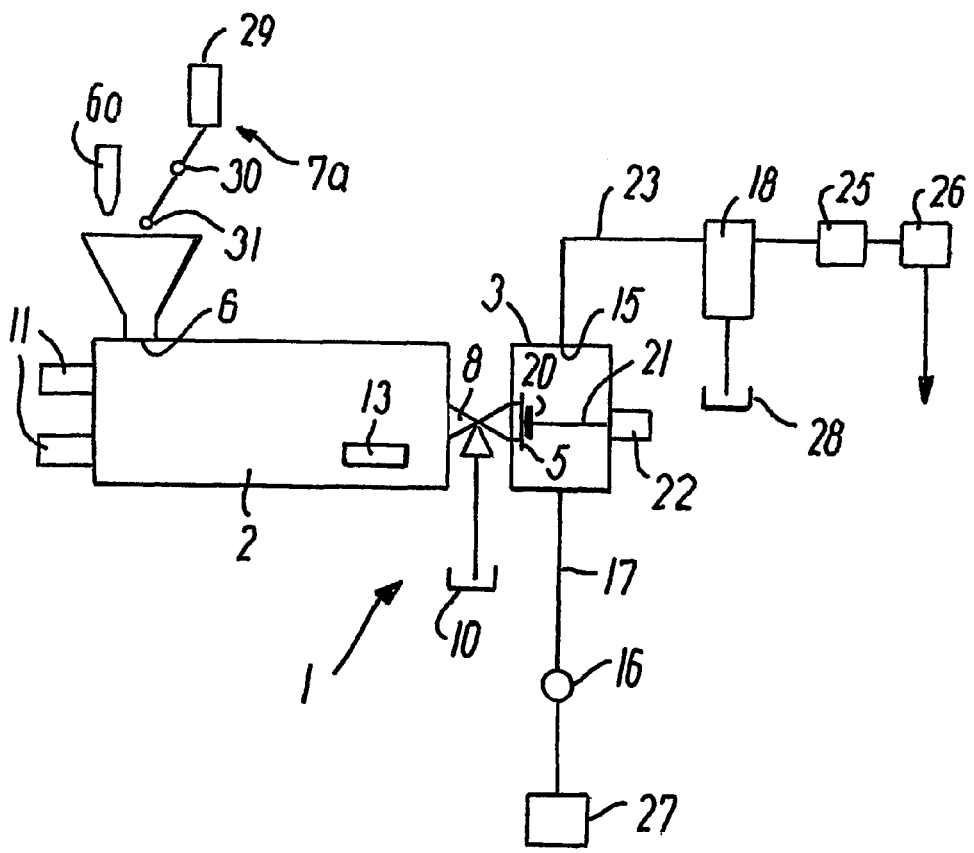
Figure 3:
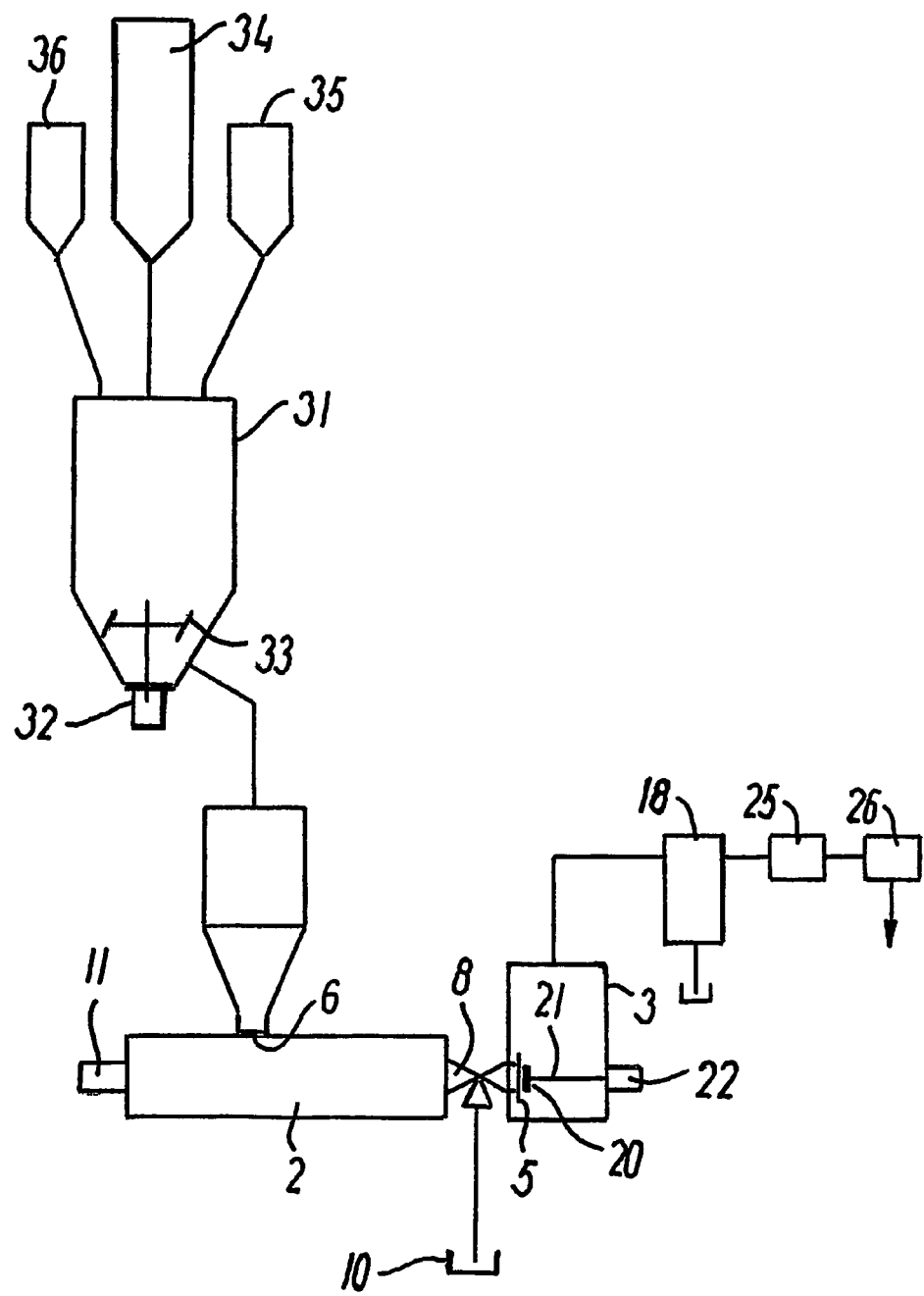

Non-limiting examples and embodiments of the system and the method according to the invention are described in the following in further detail with reference to the highly schematic drawings, in which FIGS. 1-3 illustrates three embodiments of a gum composition extruder and granulating system according to the present invention.

As used herein the term "gum base" refers in general to a commercially available gum base suitable for production of chewing gum. Such gum bases normally comprise natural and/or synthetic resins and optionally other ingredients.

The term "gum composition" as used herein may be a gum base as defined above, a gum base comprising one or more ingredients (e.g. colouring agents, fillers, non-sensitive flavours capable of sustaining mixing of gum base at temperatures of about 120° C. for longer periods of time, such at 10 to 15 minutes, etc.), or it may be a chewing gum composition as defined below.

The term "chewing gum composition" is the final formulation, which constitutes at least a part of the compressed chewing gum product ready for sale to or use by the consumer. The chewing gum composition comprises at least flavour an typically also sweeteners and optionally other ingredients like colouring agents, pharmaceutical agents, enzymes, humectants, flavour enhancers, anticaking agents etc. Furthermore "chewing gum product" denotes a ready for use chewing gum, e.g. comprising compressed granules of chewing gum composition possibly mixed with bulk sweeteners, or other ingredients and optionally coated.

The term "gum granules" or "granules" as used herein refers to particulate material of gum composition. The granules can have the size of pellets, viz. sizes in the range from 3 to 6 mm, but preferably they have average diameters below about 3 mm, such as in the range of 0.1 to 2.5 mm.

The term "average diameter" as used herein is defined as the diameter of a sphere having the same volume as the granule. Although the granules produced according to the present invention mostly are substantially spherically, variations in shape may occur, and according to the definition granules having the same volume also have the same average diameter.

Unless otherwise indicated all percentages are weight % (denoted % Wt.).

In FIG. 1 a chewing gum granulating system generally denoted 1 comprises at least an extruder 2 and a granulating apparatus 3 having a chamber 4 with a die plate 5. The extruder 2 is equipped with a first inlet 6 for feeding gum composition to the extruder 2 and with a second inlet 7 for feeding flavour to the gum composition in the extruder 2. The gum composition is fed from a gum supply device 6a to the first inlet, and the flavour is fed from a flavour supply device 7a to the second inlet. There can also be further inlets for feeding e.g. one or more sweeteners. When several flavours with very different capabilities to cope with elevated temperatures are to be added to the gum composition in the extruder, one inlet for the more stable flavour can be provided together with or in proximity to the first inlet 6, and another inlet for the less stable flavour can be located in closer proximity to the outlet end of the extruder. In this manner it is possible to control the holding time of the individual flavours within the extruder to the sensibility of the flavours to exposure to elevated temperatures.

The extruder 2 delivers pressurized chewing gum composition to the inlet side of die plate 5 via a flow connection between an outlet on the extruder and an inlet of the granulating apparatus. The flow connection is provided with a valve 8, which in one position provides unrestricted passage from the extruder to the die plate, and in another position connect the extruder outlet with a drain pipe 9 leading to a receptacle 10 for discharged gum composition. Although it is possible to re-cycle discarded gum composition to inlet 6 it is not preferred because the added flavour will also be re-cycled.

The extruder 2 is a single screw extruder provided with a drive motor 11, preferably an electric motor with settable speed, or a hydraulic motor. The extruder can have one or more heating devices 12, 13 which can be included in the barrel of the extruder or can be associated with the screw. The heating devices can e.g. be of electrical heater type or heat exchanger type where the latter can be supplied with heating fluid such as hot water or hot oil.

The granulating chamber 4 has an inlet 14 for cooling liquid and an outlet 15 for a slurry of suspended granules and cooling liquid. A pump 16 supplies cooling liquid via an inlet pipe 17. The pump can be fed with fresh cooling liquid from a source (not shown) or it can be supplied with re-circulated cooling liquid from a strainer unit 18 via a pipe 19. A control valve (not shown) regulates the degree of re-circulation. The system can also have an intercooler (not shown) for cooling re-circulated cooling liquid.

Cutting means, such as rotating knives 20, act on the outlet side of the die plate. The chewing gum composition extruded through openings in the die plate is cut into granules by the cutting means. The cutting means can be reciprocating knives, but is preferably embodied as rotating knives mounted at the end of a drive axle 21 which is driven by a motor 22, such as an electric motor or a hydraulic drive motor. The motor preferably has settable speed.

The die plate is exchangeable so that several different die plates with different configuration of the openings can be used in the same granulating apparatus. The actual die plate configuration is chosen according to the desired size of granules.

An outlet pipe 23 connects outlet 15 with a dryer device in the form of strainer unit 18, in which the granules are separated from the cooling liquid. The dryer device can be of any commercially available type. The dryer can be associated with a mixer 24 wherein the granules are mixed with e.g. anti-agglomerating agent, sweetener, flavour, tabletting aids etc. to form a mixture. The system can optionally includes a classifying unit 25 with one or more sieves. Granules are either directly after straining and possible dusting or coating or after a possible intermediate storage and/or mixing with granules of different sizes or types fed to a tablet pressing machine 26 in which the granules are included in compressed gum tablets.

In the following description of further embodiments the same reference numerals as used in FIG. 1 are for the sake of simplicity used to denote features of the kind and function. Only difference with respect to the previous embodiment(s) are described.

The extruder depicted in FIG. 2 has two screws journalled side by side in the extruder barrel and two motors 11 for independent control of the individual screw. The screws are preferably counter-rotating, and it is also possible to use only one motor 11 in combination with a suitable gearing.

The pump 16 feeding the granulating chamber is connected to a supply 27 for cooling liquid, and spent cooling liquid is discharged from strainer 18 to a drain 28.

The first inlet 6 includes a hopper mounted on the extruder barrel above the first inlet. The supply 6a for gum composition includes a storage unit for gum pellets and a gravity feeder with a control valve for dosing the desired amount of gum pellets down into the hopper. The storage unit with gravity feeder and controls are e.g. available from the German company Brabender Technologie KG.

The supply 7a is for liquid flavour, which from a container 29 and a metering device 30 is supplied under pressure to a nozzle in a spray device 31. The spray device can be mounted within the hopper or above the hopper and is directed at the supplied pellets. The liquid flavour is sprayed onto the pellets.

The embodiment of FIG. 3 is in particular suitable for mixing the gum pellets with dry flavour and possibly also sweetener. A blender 31 includes a motor 32 with a vertical drive shaft for blades 33 inside the blender. The blender is connected to a storage 34 for gum pellets, a storage 35 for flavour, and a storage 36 for sweetener. Each storage has dosing or metering units to individually control the amounts of material supplied to the blender so that the desired gum composition is obtained in the extruder. The blender and storage system can be of the type "GraviBatch Blender" from the German company Brabender Technologie KG. The extruder can also be supplied with supplies for liquid flavour as described above.

The gum base used in the method according to the invention may be any water-insoluble gum base well known in the art. Illustrative examples of suitable polymers for gum base include, natural and synthetic elastomers, resins and rubbers. For example, suitable polymers include substances of vegetable origin such as rubber latex solids, chicle, gelutong, nispero, rosidinha, pendare, perillo, niger gutta, tunu, gutta percha, or crown gum. Synthetic elastomers such as butadiene-styrene copolymers, isobutylene-isoprene copolymers, polyethylene, polyisobutylene, petroleum wax or polyvinylacetate and mixtures thereof are also useful in gum base.

Gum base may also contain elastomer solvents to aid in softening the gum base. Such materials may include methyl, glycerol or pentaerythritol esters of rosins; methyl, glycerol or pentaerythritol esters of modified rosins, such as hydrogenated, dimerized or polymerized rosins; mixtures thereof and the like.

A variety of traditional ingredients such as plasticizers or softeners, such as lanolin, stearic acid, sodium stearate, potassium stearate, glyceryl, triacetate, glycerine, natural waxes, petroleum waxes such as polyurethane waxes, paraffin waxes and microcrystalline waxes, may also be incorporated into a gum base to obtain a variety of desirable textures and consistency properties.

Other conventional ingredients that may be present in a gum base include a hydrophilic-type detackifier that will absorb saliva and become slippery. The hydrophilic type detackifier should preferably be incompatible with the elastomer and solvent for the elastomer.

Gum base may also include hard waxes that serve as lubricants. Examples of such hard waxes include candelilla wax, paraffin wax, carnauba wax, ozokerite, oricuri, microcrystalline wax and the like.

Gum base may also include a softening agent and/or lubricant that may comprise one or more hydrogenated vegetable or animal fats preferably having a high melting point above about 22° C.

Gum base may also include an emulsifier to impart hydrophilic properties to the gum base. The emulsifier causes saliva to be absorbed into the gum base, thereby making the gum base slippery. Examples of such emulsifiers may include glyceryl monostearate, phosphatides such as lecithin and sephalin, mixtures thereof and the like.

The gum base may also include particles of chalk or the like as a bulking agent and/or texturizer. Examples of such texturizing agents or inert fillers suitable for use in gum base include, calcium carbonate, aluminum hydroxide, alumina, magnesium carbonate, talc, aluminum silicates, mixtures thereof and the like.

The flavouring agents suitable for use in the present invention can e.g. be a natural, natural-identical, or artificial flavouring substance, or a mixture thereof. At room temperature the flavouring agent may be in solid state as a dry powder or flavour granules, or in liquid state as an essence or oil, or mixtures thereof. The dry flavours may include standard powder (i.e. a liquid flavouring agent mixed homogeneously with a powder carrier material), spray dried powder whereby the flavouring agent is coated by a protective layer (i.e. microencapsulated), freeze dried powder, or flavour granules. Flavour granules differ from the powders by substantially larger particle sizes (approximately 500-1500 µm) compared to powders (approximately 10-150 µm). Optionally these flavour granules may also comprise a colouring agent and thereby provide a visual effect in the product. Furthermore, seeds derived from berries and fruits may also be included as dry flavouring agents.

The liquid flavouring agents may include essences also known as extracts which are concentrated flavouring agents produced either by reducing a liquid until it is a syrup or by dissolving a spice or flavouring oil in alcohol, and essential oils also known as flavouring oils which are highly concentrated essences.

Preferably, the solid and the liquid flavouring agents are encapsulated in a protective matrix protecting them from heat and moisture and thereby reducing the oxidation and evaporation of the liquid flavouring agent. As a result the stability of the flavouring agent is markedly improved extending the shelf life of the product. These encapsulating processes are well known to those skilled in the art.

A variety of one or more flavouring agents may be used. Flavouring agents suitable for use in the present invention include natural, natural-identical, and/or artificial flavouring substance, or mixtures thereof, in their solid and/or in their liquid state.

The person skilled in the art will recognize that natural and artificial flavouring agents may be combined in any sensorially acceptable blends.

Sweeteners can e.g. be selected among bulk sweeteners such as sugar sweeteners, less or non-sweet sugars or polysaccharides, non-sugar sweeteners, such as the polyols isomalt, sorbitol, sorbitol syrup, mannitol, xylitol, hexa-resorcinol, maltitol, isomaltol, erythriol, lactitol, xylose, tagatose and hydrogenated starch hydrolysates (maltitol syrup); artificial high potent sweeteners or intense sweeteners such as the dipeptides aspartame, neotame and alitame; N-sulfonylamides such as saccharin including the salts thereof and acesulfam including the salts thereof; or any combination thereof.

The gum composition and gum base may optionally be mixed with colouring agents to obtain desirable visually effects. Useful commercially available colouring agents are DUA LAKE or EURO LAKE, which can be provided in various colours. Natural colours like e.g. riboflavin, beta-carotene, chlorophyll and hibiscus are also suitable. Optionally gum granules in different colours may be used to provide a tablet with more colours.

During extrusion of the gum composition the differential pressure between the gum composition in the extruder and the gum composition in the liquid filled chamber, i.e. over the die device is suitable above 10 bar, preferably above 18 bar, such as in the range of 25 to 90 bar.

The tablet pressing machine 26 may be any conventional tablet pressing machine capable of pressing tablets comprising gum granules. The final tablets preferably have a weight in the range of 0.5 to 3.5 g, conveniently in the range of 1.0 to 2.5 g.

As mentioned previously, the gum composition or gum base may be feed to the extruder as conventionally pellets or it may be feed to the extruder as a hot viscous coherent composition directly from the gum base production line. The hot composition will normally have a temperature in the range of 95 to 135° C., preferably in the range 105 to 125° C., which is sufficient to heat the extruder. In this case it is not necessary to have heating means on the extruder. Sometimes it may be advantageously to cool the gum base before it enters the extruder to obtain temperatures below 70° C. The cooling may be cooling using gas or liquid as cooling medium. After being extruded to the die plate, the gum composition is cooled by the water in the granulating chamber. Optionally the gum base production line may feed several extruders to obtain granules with different size and characteristics.

EXAMPLE 1

A commercially available gum base based on synthetic resins (DANfree T firm 1, available from Gumlink A/S, Denmark) was used to produce chewing gum products according to the invention.

Gum base in the form of pellets and menthol flavour crystals (MENTHOL BP/USP, available from SHARP MENTHOL INDIA LIMITED, India), aspartame powder (Aspartame, available from ZHUN YONGXINRONG BIOCHEMICAL PRODUCTS CO., LDT, China), and acesulfame-K (Sunett, particle size A, available from Nutrinova GmbH, Germany) were added to the hopper at the first inlet 6. Mint oil (PD3-68H, type 1100102, available from A.M.TODD COMPANY, U.S.A) in an amount of 4.22% Wt. was dosed to the second inlet and mixed to the gum composition in the extruder. The chewing gum composition extruded through the die plate had the composition shown in Table 1.

TABLE 1

| Gum composition | |
|---|---|
| Ingredient | Amount % Wt. |
| gum base | 89.24 |
| menthol flavour crystals | 6.08 |
| aspartame powder | 0.23 |
| acesulfame K | 0.23 |
| mint oil | 4.22 |

The extruder (Leistrits ZSE/BL 360 kw 104, available from GALA GmbH, Germany) extruded the composition through the die plate into the liquid filled chamber (granulator A5 PAC 6, available from GALA GmbH, Germany).

The extruder delivered the composition at a feed rate of 250 kg/h to the die plate. The extruder screw speed was 247 rpm. The minimum temperature in the extruder was 44° C. and a temperature of less than 70° C. was maintained along about ¾ of the extruder barrel length, until the composition passed the heating device 13 in the outlet end of the extruder. Here the composition was heated to en extruder exit temperature of 109° C. The extruder produced a pressure difference of 71 bar.

The composition was extruded through the die plate, which was heated to a temperature of 177° C. and had 336 holes with diameter 0.36 mm. In the granulator chamber the extruded composition was cut to granules by a cutter with 8 blades and cutter speed 1999 rpm. The granules were cooled and transported to the strainer unit 18 (a centrifugal dryer TWS 20, available from GALA GmbH, Germany) in water with temperature 19° C. and flow 22 m³/h. The average cooling and transport time in water was approx. 2 seconds. The granule rate was 250 kg/h and the average diameter of the obtained granules was 1.24 mm.

The chewing gum granules were individually mixed in a standard mixer with sweeteners (intense sweeteners: aspartame powder and acesulfame K; bulk sweetener: sorbitol, available from CERESTAR Scandinavia A/S, Denmark).

TABLE 2

Mixture for pressed tablets

| Ingredient | % Wt. |
|---|---|
| gum composition granules | 40.58 |
| aspartame powder | 0.14 |
| acesulfame K powder | 0.14 |
| sorbitol powder | 59.14 |

Before pressing the mixtures passed a standard horizontal vibration sieve removing particles larger than 2.6 mm. The mixture was subsequently lead to a standard tablet pressing machine comprising dosing apparatus (P 3200 C, available from Fette GmbH, Germany) and pressed into compressed chewing gum tablets. The filling depth was 7.5 mm and the diameter 7.0 mm. The tablets were precompressed to 5.0 mm and then main compressed to 3.2 mm using a pressing pressure of 33.0-33.6 kN. There were 61 punches on the roter, and the rotor speed used was 11 rpm. The individual compressed tablets had a weight of approx. 1.5 g.

A test group assessed the chewing gum tablets manufactured from gum granules and found the taste to be excellent and better than tablets obtained by pre-mixing the flavour and sweetener, pelletizing the pre-mix and feeding the pellets to the hopper of the extruder. All of the assessed tablets manufactured according to the invention demonstrated good properties with regard to duration of taste.

The obtained tablets had a good tight texture and provided a very satisfactory cohesion during the initial phase of chewing.

The invention claimed is:

1. A method for producing a final product of chewing gum tablets, the method comprising:
   producing an intermediate product of chewing gum granules for use in compressed chewing gum tablets, wherein the method comprises at least the steps of:
   a) feeding a gum composition into an extruder;
   b) adding at least one flavor including fragile flavor components to the gum composition in the extruder immediately before the gum composition is extruded, wherein the fragile flavour is a flavour which is not capable of sustaining mixing at temperatures of about 120° C. over a time period of approximately 10 to 15 minutes;
   c) pressurizing the thus flavored gum composition in the extruder while controlling temperature and pressure of the gum composition so that the temperature of the flavored gum composition in the extruder is below 70° C. when the pressure of the flavored gum composition is in the range from 1 to 5 hPa, whereas the pressure of the flavored gum composition in the extruder is of at least 5 hPa if the temperature of the flavored gum composition exceeds 70° C.;
   d) extruding the gum composition through a die means; and
   e) cutting the extruded gum composition in a liquid filled chamber;
   producing the final product of chewing gum tablets by further performing the step of:
   including the extruded and cut gum composition in chewing gum tablets compressed in a tablet pressing apparatus.

2. The method of claim 1 wherein the flavored gum composition is maintained enclosed in the extruder until the extrusion in step d).

3. The method of claim 1 wherein the temperature of the flavored gum composition is kept below 55° C. when the pressure of the flavored gum composition is in the range from 1 to 5 hPa.

4. The method of claim 1 wherein the flavor added includes liquid flavor.

5. The method of claim 1 wherein the gum composition in step a) is a gum base.

6. The method of claim 1 wherein the gum composition in step a) is a gum base in the form of gum base pellets.

7. The method of claim 1 wherein the flavor added includes dry flavor.

8. The method of claim 1, wherein at least one sweetener is added to the gum composition in the extruder.

9. The method of claim 8 wherein the sweetener is a high potent sweetener.

10. The method of claim 9, wherein the sweetener is a high potent sweetener selected from the group consisting of dipeptides and N-sulfonylamides.

11. The method of claim 1 wherein dry flavor and powder sweetener are blended and subsequently added to the gum composition in the extruder.

12. The method of claim 1, wherein the gum composition is blended with dry flavor before entering the extruder.

13. The method of claim 1, wherein gum composition is blended with powder sweetener before entering the extruder.

14. The method of claim 1, wherein the gum composition is blended with dry flavor and powder sweetener before entering the extruder.

15. The method of claim 1, further comprising:
   conveying the extruded and cut gum composition to a tablet pressing apparatus.

16. The method of claim 15 wherein the temperature of the flavored gum composition is controlled to be below 70° C. during said pressurizing when the pressure of the flavored gum composition is in the range from 1 to 5 hPa.

17. The method of claim 15 wherein the pressure of the flavored gum composition is controlled to be of at least 5 hPa during said pressurizing when the temperature of the flavored gum composition exceeds 70° C.

18. The method of claim 15 wherein, in addition to the extruded and cut gum composition, at least one bulk sweetener is supplied to the tablet pressing apparatus.

19. The method of claim 15, wherein the extruded and cut gum composition included in the chewing gum tablets has an average diameter in the range from 0.1 mm to 2.5 mm.

20. A method of claim 15, wherein the extruded and cut gum composition included in the chewing gum tablets has an average diameter in the range from 0.25 to 1.95 mm.

21. The method of claim 15, wherein the gum composition is a gum base.

22. The method of claim 15, wherein the gum composition is a gum base fed from a gum base production line without intermediate storage and/or pelletizing.

23. The method of claim 22, wherein the gum base fed from a gum base production line without intermediate storage and/or pelletizing has a temperature in the range 95-135° C.

24. The method of claim 22, wherein the gum base fed from a gum base production line without intermediate storage and/or pelletizing has a temperature in the range 105-125° C.

25. The method of claim 22, wherein the gum base fed from a gum base production line without intermediate storage and/or pelletizing is cooled to a temperature of 70° C. and below before the feeding step.

26. The method of claim 22, wherein the gum base fed from a gum base production line without intermediate storage and/or pelletizing is cooled to a temperature of 55° C. and below before the feeding step.

* * * * *